(12) United States Patent
Liu et al.

(10) Patent No.: US 11,824,443 B2
(45) Date of Patent: Nov. 21, 2023

(54) SINGLE-INDUCTOR MULTIPLE-OUTPUT DC-DC BUCK CONVERTER

(71) Applicant: SOUTH CHINA UNIVERSITY OF TECHNOLOGY, Guangdong (CN)

(72) Inventors: Yuyang Liu, Guangdong (CN); Bin Li, Guangdong (CN); Yanqi Zheng, Guangdong (CN); Zhaohui Wu, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 281 days.

(21) Appl. No.: 17/604,765

(22) PCT Filed: Aug. 19, 2019

(86) PCT No.: PCT/CN2019/101345
§ 371 (c)(1),
(2) Date: Oct. 19, 2021

(87) PCT Pub. No.: WO2021/022582
PCT Pub. Date: Feb. 11, 2021

(65) Prior Publication Data
US 2022/0181974 A1 Jun. 9, 2022

(30) Foreign Application Priority Data
Aug. 8, 2019 (CN) .......................... 201910728061.2

(51) Int. Cl.
*H02M 3/158* (2006.01)
*H02M 1/00* (2006.01)
(Continued)

(52) U.S. Cl.
CPC .......... *H02M 3/158* (2013.01); *H02M 1/009* (2021.05); *H02M 1/14* (2013.01); *H02M 3/155* (2013.01)

(58) Field of Classification Search
CPC .................. H02M 1/009; H02M 1/14; H02M 3/155–1588
See application file for complete search history.

(56) References Cited

U.S. PATENT DOCUMENTS 8,581,562 B2 * 11/2013 Chen ...................... H02M 3/158
323/283
9,099,919 B2 * 8/2015 Jing ....................... H02M 3/158
(Continued)

FOREIGN PATENT DOCUMENTS

| CN | 102710127 | 10/2012 |
| CN | 105515376 | 4/2016 |
| CN | 109818497 | 5/2019 |

OTHER PUBLICATIONS

"International Search Report (Form PCT/ISA/210) of PCT/CN2019/101345" dated Apr. 23, 2020, with English translation thereof, pp. 1-4.

*Primary Examiner* — Yusef A Ahmed
(74) *Attorney, Agent, or Firm* — JCIP GLOBAL INC.

(57) ABSTRACT

This disclosure discloses a single-inductor multiple-output DC-DC buck converter, which includes a power conversion unit and i charge controllers, as well as a phase-locked loop, a logic unit, a driving unit, and an input trunk duty ratio generation unit. The charge controllers are connected to the driving unit through the logic unit. The logic unit is further connected to the phase-locked loop and the phase-locked loop is connected to the driving unit through the input trunk duty ratio generation unit. The driving unit is connected to the power conversion unit. The disclosure applies charge control to every output branch path, and adopts a phase-locked loop as the cycle control, which effectively suppresses the cross modulation effect of every branch path, and does not require the last branch path to have a sufficiently (Continued)

heavy load, which broadens the load range, while taking into account other performance requirements concurrently.

2 Claims, 7 Drawing Sheets

(51) Int. Cl.
  *H02M 1/14* (2006.01)
  *H02M 3/155* (2006.01)

(56) References Cited

U.S. PATENT DOCUMENTS

| | | | |
|---|---|---|---|
| 9,973,083 B1* | 5/2018 | Rose | H02M 1/08 |
| 10,700,604 B2* | 6/2020 | Hedayati | G05F 1/462 |
| 2004/0201281 A1* | 10/2004 | Ma | H02M 3/158 |
| | | | 307/38 |
| 2010/0301827 A1* | 12/2010 | Chen | H02M 3/156 |
| | | | 323/299 |
| 2011/0068757 A1* | 3/2011 | Xu | H02M 3/158 |
| | | | 323/271 |
| 2012/0062030 A1* | 3/2012 | Xu | H02M 3/1582 |
| | | | 307/31 |
| 2012/0169307 A1* | 7/2012 | Chen | H02M 3/158 |
| | | | 323/271 |
| 2013/0147457 A1* | 6/2013 | Kim | H02M 3/158 |
| | | | 323/311 |
| 2013/0162228 A1* | 6/2013 | Menegoli | H02M 3/158 |
| | | | 323/267 |
| 2014/0232359 A1* | 8/2014 | Dash | H02M 3/158 |
| | | | 323/235 |
| 2014/0246908 A1* | 9/2014 | Chew | H04Q 9/00 |
| | | | 307/31 |
| 2019/0245498 A1* | 8/2019 | Botti | H03K 17/687 |
| 2022/0337162 A1* | 10/2022 | Shen | G06F 1/3206 |
| 2023/0216409 A1* | 7/2023 | Ravi | H02M 3/158 |
| | | | 323/282 |

* cited by examiner

SINGLE-INDUCTOR MULTIPLE-OUTPUT DC-DC BUCK CONVERTER

CROSS-REFERENCE TO RELATED APPLICATION

This application is a 371 of international application of PCT application serial no. PCT/CN2019/101345, filed on Aug. 19, 2019, which claims the priority benefits of China Patent Application No. 201910728061.2, filed on Aug. 8, 2019. The entirety of each of the above mentioned patent applications is hereby incorporated by reference herein and made a part of this specification.

BACKGROUND

Technical Field

This disclosure relates to the technical field of DC-DC converters, and in particular to a single-inductor multiple-output DC-DC buck converter.

Description of Related Art

The single-inductor multiple-output buck DC-DC (SIMO Buck DC-DC) technology, hereinafter referred to as SIMO, is a switching converter. As shown in FIG. 1, SIMO uses only a single inductor and multiple capacitors to enable multiple branch paths of DC output to be produced from a single DC input, which is mainly used in the scenario of DC voltage source conversion. The SIMO not only takes into account the characteristic of high efficiency of the switching converter, it also increases utilization rate of the layout, so as to adapt to the trend of integrated circuit development. However, when compared to the level of development of the single-inductor single-output DC conversion technology, the SIMO still has issues such as low transmission efficiency, serious cross modulation, a large output ripple wave, small load range, and requiring complex controllers.

Therefore, research techniques in recent years have focused on usage of ordered power-distributive control (OPDC) timing sequence. As shown in FIG. 2, in the OPDC timing sequence, an inductor current $I_L$ charges a load sequentially within a switching cycle, and the charging duration is $D_1$ to $D_4$. Therefore, the average value of the inductor current is expressed as a sum of the load current. This timing sequence technique may increase the load range while reducing the output ripple wave. However, as each load shares the inductor current, the output voltages of the other branch paths are affected when the load of a certain branch path changes, which manifests as voltage overshoot or voltage undershoot. This phenomenon in which the output voltages of other branch paths change due to a change in a certain output load is known as the cross modulation effect, as shown in FIG. 3. Therefore, suppression of this effect is of utmost importance when there is a heavy load.

The cross modulation effect reflects a capability of a controller in distributing the inductor current, and its magnitude is max $[\Delta V_{ox}/\Delta I_{loady}]$, $x \neq y$ during a transient occurrence. The smaller the value, the better the independent control capability of each output branch path, and it is mainly affected by the SIMO control method. The charge control in the current SIMO control method has achieved good results in reducing the cross modulation effect. The typical charge control is to provide an independent control loop for a certain output branch path, which implementation is shown in FIG. 4 and is described as follows. An activation signal pulse is inputted into a RS flip-flop $RS_i$, and an output turn-on time signal $D_i$ of the RS flip-flop $RS_i$ is set to high. The turn-on time signal $D_i$ controls turning-on of a power switch $SW_i$ of the branch path, and the inductor current $I_L$ charges an output capacitor $C_{oi}$ and a load $I_{loadi}$ of the branch path. Concurrently, a logic inverse signal $\bar{D}_i$ of the turn-on time signal $D_i$ cuts off a sampling switch $SS_i$, so that a sampled inductor current signal $I_{Lsen}$ charges a sampling capacitor $C_i$. A comparator $CP_i$ outputs an end flag signal $S_i$ when a voltage on the sampling capacitor Ci is greater than an output voltage $V_{ci}$ of an error amplifier $A_i$. The RS flip-flop is flipped and reset through the end flag signal $S_i$, so that the turn-on time signal $D_i$ is set to low, thereby turning off the power switch $SW_i$ of the branch path. Concurrently, the sampling switch $SS_i$ is turned on, the voltage on the sampling capacitor $C_i$ is reset, and the output branch path completes a charge cycle, where i is a branch path number.

When the above-mentioned charge control controls a certain output branch path, a signal that activates the end flag signal $S_i$ comes from a previous branch path, and a signal that ends the end flag signal $S_i$ is produced by a corresponding loop of the charge control. However, for an output branch path that is turned on last in a fixed switching cycle, the signal that ends the end flag signal $S_i$ has to only come from a start signal of the next cycle. Therefore, in the current technology, when the last branch path is not connected to a load, an input source has to be a rechargeable battery and a larger inductor current $I_L$. However, the rechargeable battery serving as the input source limits applications of the SIMO and a larger inductor current reduces the transmission efficiency of the SIMO. Therefore, research on this technology has gradually decreased in recent years. When the last branch path does not use the charge control and is connected to a load, the cross modulation effect of the last branch path is more than three times larger than that of a loop controlled by the charge control. The signal that ends the end flag signal $S_i$ of the last output branch path may be determined by the controller when the switching cycle is not fixed, and a phase-locked loop (PLL) is used to lock the switching cycle instead. However, this method currently uses a comparator for control, and an output voltage controlled by the comparator has a large ripple wave and low output voltage accuracy. In addition, the control of the comparator is non-linear, which is not suitable for the current linear design method of the SIMO.

SUMMARY

This disclosure provides a single-inductor multiple-output DC-DC buck converter, which effectively suppresses cross modulation effect of every branch path, and can take into account performance requirement of an output voltage.

The single-inductor multiple-output DC-DC buck converter according to the disclosure includes a power conversion unit and i charge controllers. The power conversion unit includes i output branch paths that share a common point at an input trunk, and a path of the charge controller corresponds to an output branch path. The converter further includes a phase-locked loop, a logic unit, a driving unit, and an input trunk duty ratio generation unit. The i charge controllers respectively collect a current signal of the input trunk, generate i end flag signals according to the current signal, and input the i end flag signals into the logic unit. The logic unit generates i turn-on time signals and a frequency signal. The i turn-on time signals are inputted to control terminals of the i output branch paths through the driving unit, and the frequency signal is inputted to the phase-locked loop, that is, the input trunk duty ratio generation unit. The phase-locked loop generates a PLL voltage signal, and the PLL voltage signal is inputted to the input trunk duty ratio generation unit. The input trunk duty ratio generation unit generates a turn-on control signal according to the PLL voltage signal and the frequency signal, and the turn-on control signal is inputted to a control terminal of the input trunk through the driving unit. The driving unit is configured to convert a low-power electrical signal into an electrical signal for controlling a power output, where i is a natural number.

As a further improvement, the frequency signal is consistent with a first turn-on time signal.

Furthermore, the logic unit includes multiple inverters, multiple RS flip-flops, a first OR logic device, and a NOR logic device. Input terminals of the inverters and output terminals of the i end flag signals of the charge controllers are respectively correspondingly connected, output terminals of the inverters are respectively correspondingly connected to R terminals of the RS flip-flops, and the output terminals of the inverters are further connected to S terminals of the adjacent RS flip-flops. The output terminal of the inverter in a last position is connected to an input terminal of the first OR logic device, Q terminals of the RS flip-flops are respectively correspondingly connected to input terminals of the NOR logic device, an output terminal of the NOR logic device is connected to another input terminal of the first OR logic device, and an output terminal of the first OR logic device is connected to the S terminal of the RS flip-flop in a first position. The Q terminals of the RS flip-flops output the i turn-on time signals. The Q terminal of the RS flip-flop in the first position outputs the first turn-on time signal.

Furthermore, the converter further includes a current sensor, which is connected to the input trunk, and the current sensor generates the current signal.

Furthermore, the input trunk duty ratio generation unit includes a compensator, a sawtooth wave generator, and a comparator. An output terminal of the phase-locked loop and an output terminal of the current sensor are both connected to an input terminal of the compensator. The frequency signal is inputted into the sawtooth wave generator. An output terminal of the compensator and an output terminal of the sawtooth wave generator are respectively connected to input terminals of the comparator, and an output terminal of the comparator is connected to the driving unit.

Furthermore, the compensator includes a buffer, a proportional derivative device, a proportional integral device, and a feedback resistor. The output terminal of the phase-locked loop is connected to an input terminal of the buffer, an output terminal of the buffer is connected to an input terminal of the proportional derivative device, an output terminal of the proportional derivative device is connected to an input terminal of the proportional integral device, an output terminal of the current sensor is connected to another input terminal of the proportional integral device, and the another input terminal of the proportional integral device is further grounded through the feedback resistor. An output terminal of the proportional integral device is connected to an input terminal of the comparator.

Beneficial Effect

Advantages of the disclosure include the following. The i charge controllers generate the i end flag signals according to the collected current signal of the input trunk, and the logic unit generates the i turn-on time signals according to the i end flag signals. The i turn-on time signals control turning-on of the i output branch paths sequentially through the action of the driving unit. Concurrently, the logic unit further generates the frequency signal according to the total turn-on time of the i turn-on time signals, and the frequency signal controls turning-on of the input trunk through the actions of the input trunk duty ratio generation unit and the driving unit. That is, within a time period of a frequency signal, the i output branch paths are turned on sequentially, so that the converter may fully utilize the entire charging cycle. The converter does not has any additional inductor current, and the power level loss with the same load is smaller, the transmission efficiency is higher, and the ripple wave of the output voltage is smaller, thereby eliminating the requirement of the input source having to be a rechargeable battery, and the limitations of application. In addition, the converter realizes charge control for all the output branch paths, therefore its cross modulation is smaller, and it does not require the last branch path to have a sufficiently heavy load, which broadens the load range.

DESCRIPTION OF THE EMBODIMENTS

The disclosure is further described with reference to the embodiments as follows, but they do not constitute any limitation to the disclosure. Any modification in limited quantity made by any individual within the scope of the claims of the disclosure is still within the scope of the claims of the disclosure.

Figure 1:
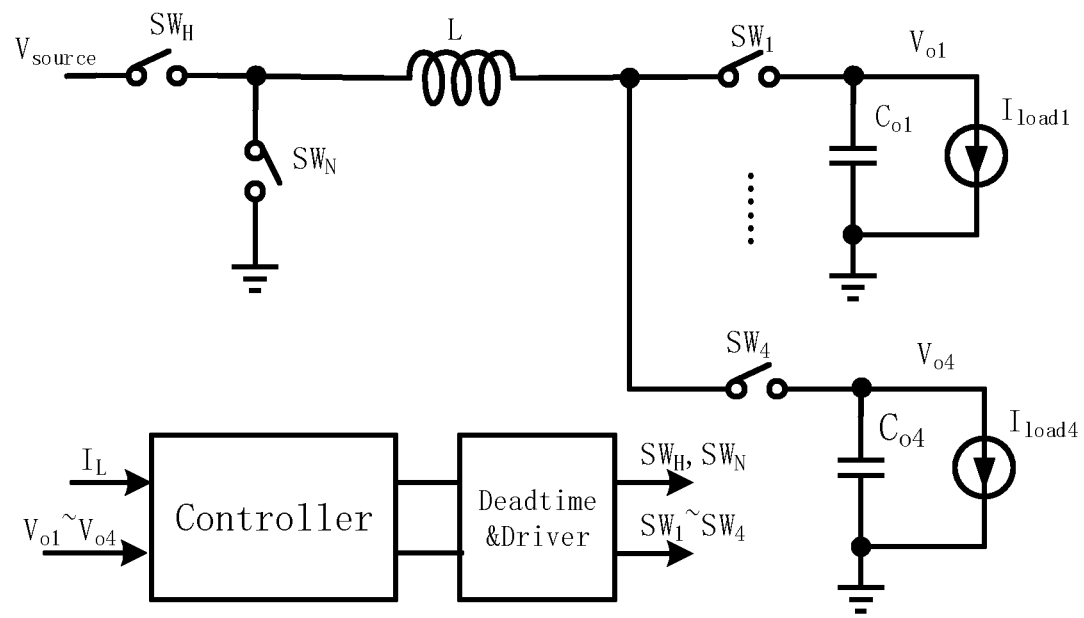
FIG. 1 is a schematic diagram of an existing SIMO Buck DC-DC structure.
Figure 2:
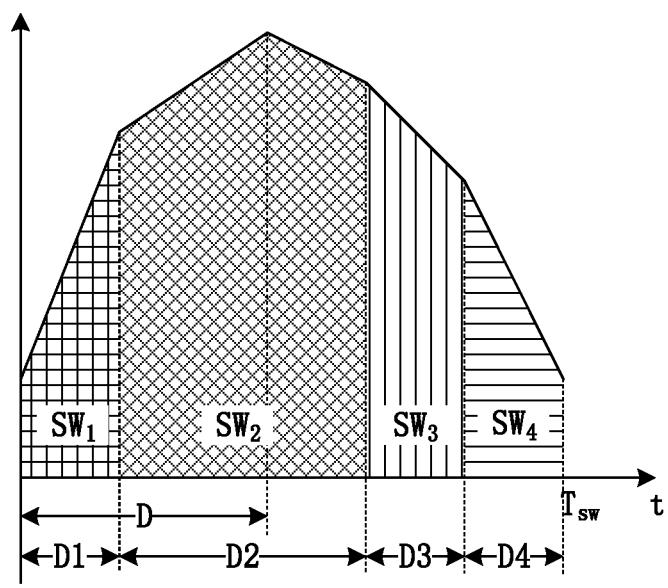
FIG. 2 is a schematic diagram of an inductor current in an ordered power-distributive control (OPDC) timing sequence during a switching cycle.
Figure 3:
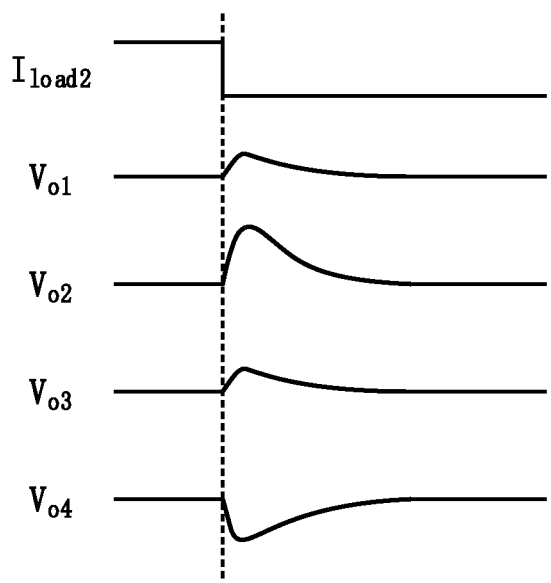
FIG. 3 is a schematic diagram of the cross modulation effect.
Figure 4:
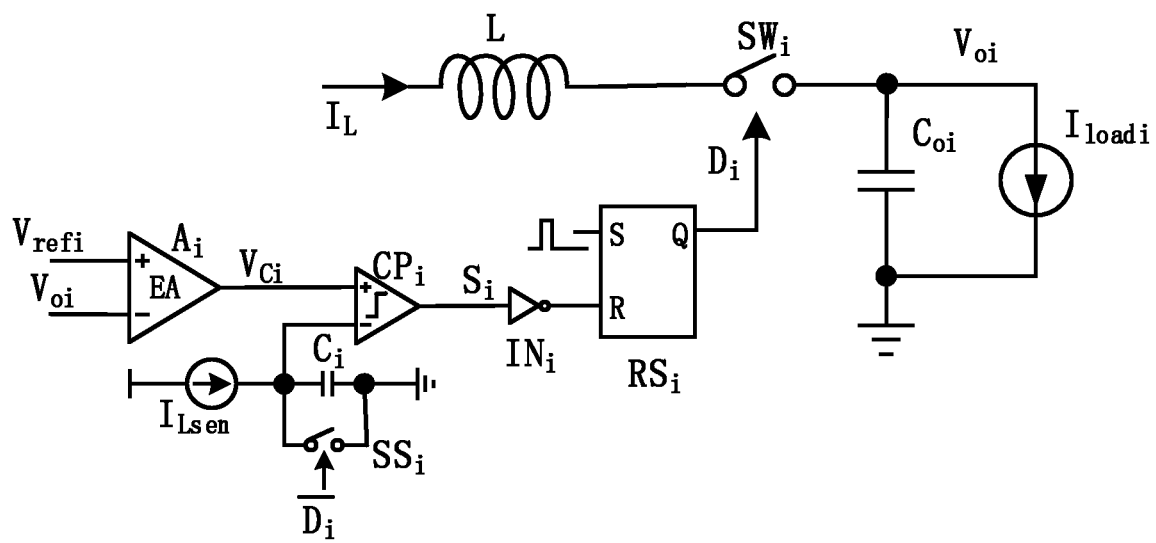
FIG. 4 is a schematic diagram of a charge control of the existing SIMO.
Figure 5:
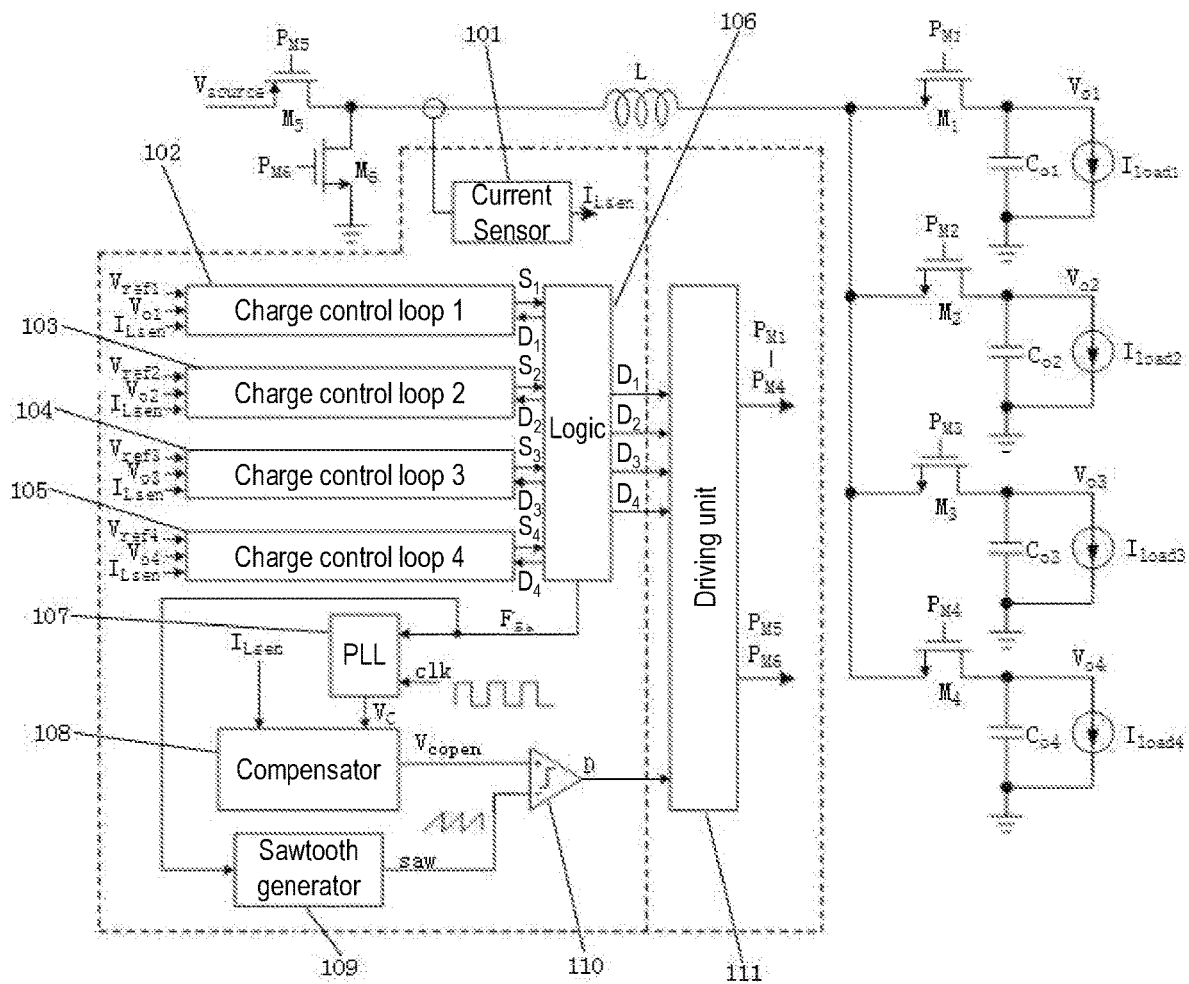
FIG. 5 is a schematic diagram of the structure of the disclosure.

With reference to FIG. 5, a single-inductor multiple-output DC-DC buck converter according to the disclosure includes a power conversion unit and i charge controllers. The power conversion unit includes i output branch paths that share a common point at an input trunk. A phase-locked loop 107, a logic unit 106, a driving unit 111, and an input trunk duty ratio generation unit are further included.

The converter further includes a current sensor 101. The current sensor 101 is connected to the input trunk, and the current sensor 101 generates a current signal $I_{Lsen}$. That is, the current sensor 101 collects a current of a power inductor L, converts the current into the current signal $I_{Lsen}$ that is of equal proportion and transmits it to all the charge controllers.

The i charge controllers respectively collect the current signal $I_{Lsen}$ of the input trunk, generate i end flag signals $S_i$ according to the current signal $I_{Lsen}$, and input the i end flag signals $S_i$ into the logic unit 106. The logic unit 106 generates i turn-on time signals $D_i$ and a frequency signal $F_{ss}$. The i turn-on time signals $D_i$ are inputted to control terminals of the i output branch paths through the driving unit 111, and the frequency signal $F_{ss}$ is inputted into the phase-locked loop 107.

In which, i is a natural number. In the embodiment, i is any one of serial numbers 1 to 4, and i in a same unit or a same connection relationship is the same.

The input trunk of the power conversion unit includes a power terminal $V_{source}$, a fifth input power tube $M_5$, a sixth input power tube $M_6$, and the power inductor L, in which the fifth input power tube $M_5$ is a P-type field-effect transistor and the sixth input power tube $M_6$ is an N-type field-effect transistor. The output branch path includes an i-th output power tube $M_i$ and an i-th output capacitor $C_{oi}$, in which the i-th output power tube $M_i$ is an N-type field-effect transistor. A drain of the i-th output power tube $M_i$ is grounded through the i-th output capacitor $C_{oi}$, and the drain of the i-th output power tube $M_i$ connected to a terminal of the i-th output capacitor $C_{oi}$ is an i-th output terminal, which outputs an i-th power signal $V_{oi}$. The power terminal $V_{source}$ is connected to a source of the fifth input power tube $M_5$, a drain of the fifth input power tube $M_5$ is connected to a source of the i-th output power tube $M_i$ through the power inductor L, the drain of the fifth input power tube $M_5$ is further connected to a drain of the sixth input power tube $M_6$, and a source of the sixth input power tube $M_6$ is grounded. A gate of the i-th output power tube $M_i$, a gate of the fifth input power tube $M_5$, and a gate of the sixth input power tube $M_6$ are all connected to corresponding output terminals of the driving unit 111. An input terminal of the current sensor 101 is connected to the drain of the fifth input power tube $M_5$, the drain of the sixth input power tube $M_6$, and a connection terminal of the power inductor L. The power conversion unit is configured to store and convert energy inputted and the input voltage of the power terminal $V_{source}$ is converted to a required DC output voltage through control of the power tubes in the power conversion unit.

Figure 6:
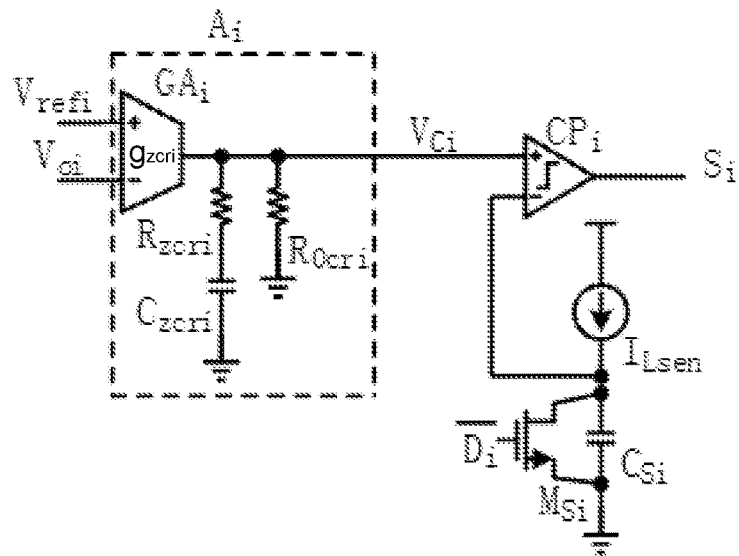
FIG. 6 is a schematic diagram of a circuit structure of a charge controller according to the disclosure.

With reference to FIG. 6, the charge controller includes an i-th error amplifier $A_i$, an i-th comparator $CP_i$, an i-th N-type field-effect transistor $MS_i$, and an i-th sampling capacitor $C_{si}$. A charge controller corresponds to an output branch path, that is, the i-th power signal $V_{oi}$ is inputted to an inverting input terminal of the i-th error amplifier $A_i$. An i-th reference voltage $V_{refi}$ is inputted at a positive input terminal of the i-th error amplifier $A_i$, and the i-th error amplifier Ai outputs an error voltage signal $V_{ci}$, through comparison of the i-th power signal $V_{oi}$ with the i-th reference voltage $V_{refi}$. Specifically, the i-th error amplifier Ai includes an i-th operational transconductance amplifier $GA_i$, an i-th compensation capacitor $C_{zeri}$, an i-th compensation resistor $R_{zeri}$, and an i-th ground resistor $R_{Oeri}$. The i-th operational transconductance amplifier $G_{Ai}$ has a non-inverting input terminal connected to the i-th reference voltage $V_{refi}$, an inverting input terminal of the i-th operational transconductance amplifier $G_{Ai}$ is connected to the i-th power signal $V_{oi}$, and an output terminal of the i-th operational transconductance amplifier $G_{Ai}$ outputs the error voltage signal $V_{ci}$. The output terminal of the operational transconductance amplifier $G_{Ai}$ is further connected to a terminal of the i-th compensation resistor $R_{zeri}$ and a terminal of the i-th ground resistor $R_{Oeri}$, another terminal of the i-th compensation resistor $R_{zeri}$ is grounded through the i-th compensation capacitor $C_{zeri}$, and another terminal of the i-th ground resistor $R_{Oeri}$ is grounded. The error voltage signal $V_{ci}$ is inputted to a non-inverting input terminal of the i-th comparator $CP_i$, and an inverting input terminal of the i-th comparator $CP_i$ is connected to a drain of the i-th N-type field-effect transistor $M_{Si}$, and an output terminal of the i-th comparator $CP_i$ outputs the i-th end flag signal $S_i$. The current signal $I_{Lsen}$ is simultaneously inputted to a drain of the i-th N-type field-effect transistor $M_{Si}$ and a terminal of the i-th sampling capacitor $C_{Si}$, and a source of the i-th N-type field-effect transistor $M_{Si}$ and another terminal of the i-th sampling capacitor $C_{Si}$ are simultaneously grounded. A logic inverse signal $\overline{D}_i$ of the i-th turn-on time signal $D_i$ is inputted to a gate of the i-th N-type field-effect transistor $M_{Si}$, and is configured to control the on-off of the i-th N-type field-effect transistor $M_{Si}$, thereby charging and discharging the i-th sampling capacitor $C_{Si}$.

With the control of the i-th N-type field-effect transistor $M_{Si}$ by the logic inverse signal $\overline{D}_i$ of the i-th turn-on time signal $D_i$, the current signal $I_{Lsen}$ charges and discharges the i-th sampling capacitor $C_{si}$, thereby producing a ramp-like signal on the i-th sampling capacitor $C_{si}$. The i-th comparator $CP_i$ produces the i-th end flag signal $S_i$ according to a voltage magnitude relationship between the error voltage signal $V_{ci}$ and the ramp-like signal of the i-th sampling capacitor $C_{si}$. The logic unit 106 generates the i-th conduction time signal $D_i$ for controlling the i-th output branch path of the power conversion unit according to the i-th end flag signal $S_i$.

Figure 7:
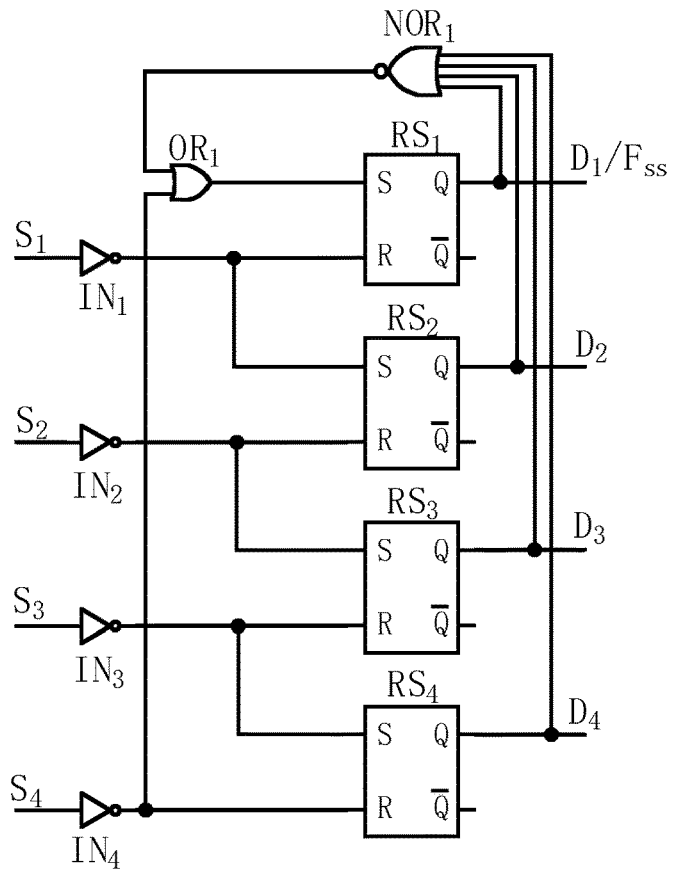
FIG. 7 is a schematic diagram of a circuit structure of a logic unit according to the disclosure.

With reference to FIG. 7, the logic unit 106 includes multiple inverters $IN_i$, multiple RS flip-flops $RS_i$, a first OR logic device $OR_1$, and a NOR logic device $NOR_1$. In the embodiment, there are four inverters $IN_i$ and four RS flip-flops $RS_i$. Input terminals of the inverters $IN_i$ and output terminals of the i end flag signals of the charge controllers are respectively correspondingly connected, output terminals of the inverters $IN_i$ are respectively correspondingly connected to R terminals of the RS flip-flops $RS_i$, and the output terminals of the inverters $IN_i$ are further connected to S terminals of the adjacent RS flip-flops $RS_i$. Specifically, the output terminal of the first inverter $IN_1$ is further connected to the S terminal of the second RS flip-flop $RS_2$, the output terminal of the second inverter $IN_2$ is further connected to the S terminal of the third RS flip-flop $RS_3$, and the output terminal of the third inverter $IN_3$ is further connected to the S terminal of the fourth RS flip-flop $RS_4$. The output terminal of the inverter $IN_i$ in the last position is connected to an input terminal of the first OR logic device $OR_1$. Specifically, the output terminal of the fourth inverter $IN_4$ is connected to the input terminal of the first OR logic device $OR_1$. Q terminals of the RS flip-flop $RS_i$ are respectively correspondingly connected to input terminals of the NOR logic device $NOR_1$, and an output terminal of the NOR logic device $NOR_1$ is connected to another input terminal of the first OR logic device $OR_1$. An output terminal of the first OR logic device $OR_1$ is connected to the S terminal of the RS flip-flop $RS_i$ in the first position. Specifically, the output terminal of the first OR logic device $OR_1$ is connected to the S terminal of the first RS flip-flop $RS_i$. The Q terminals of the RS flip-flops $RS_i$ outputs the i turn-on time signals $D_i$. The Q terminal of the RS flip-flop $RS_i$ in the first position outputs a first turn-on time signal $D_1$, that is, the Q terminal of the first RS flip-flop $RS_i$ outputs the first turn-on time signal $D_1$. The first turn-on time signal $D_1$ is consistent with the frequency signal $F_{ss}$, and is inputted into the phase-locked loop 107.

Figure 8:
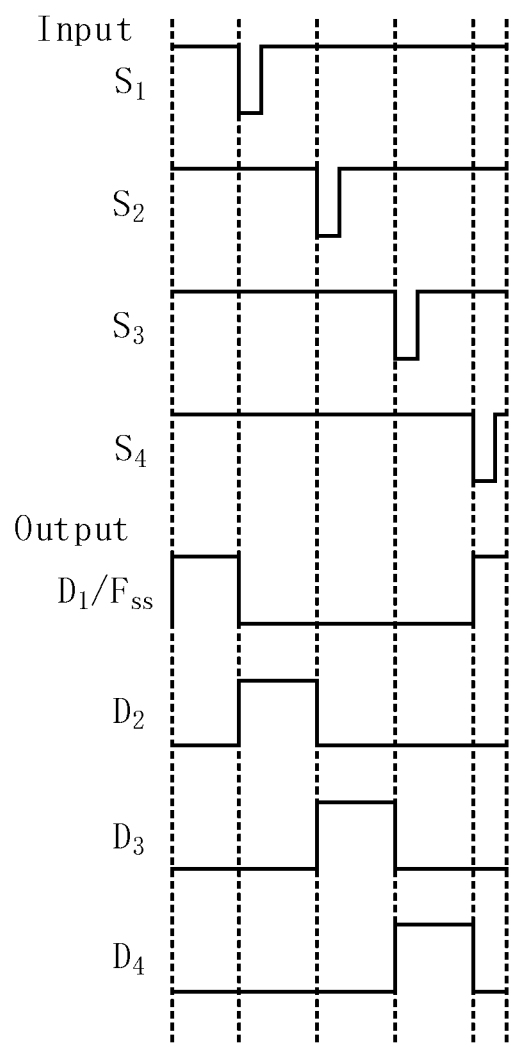
FIG. 8 is a schematic diagram of a functional timing sequence of the logic unit according to the disclosure.

The logic unit 106 generates the i turn-on time signals $D_i$ and the frequency signal $F_{ss}$ according to the i end flag signals $S_i$, and a timing sequence diagram of the signals is shown in FIG. 8. The first turn-on time signal $D_1$ is reset and a second turn-on time signal $D_2$ is set concurrently when a first end flag signal $S_1$ is at a low level. Similarly, the second turn-on time signal $D_2$ is reset and a third turn-on time signal $D_3$ is set concurrently when a second end flag signal $S_2$ is at a low level. The third turn-on time signal $D_3$ is reset, and a fourth turn-on time signal $D_4$ is set concurrently when a third end flag signal $S_3$ is at a low level. The fourth turn-on time signal $D_4$ is reset and the first turn-on time signal $D_1$ is set concurrently when a fourth end flag signal $S_4$ is at a low level. This finally forms a timing sequence of cyclically setting of the four turn-on time signals $D_1$ to $D_4$. The four turn-on time signals $D_1$ to $D_4$ are acted upon by the driving unit 111 to produce four switching frequency pulse signals $P_{M1}$, $P_{M2}$, $P_{M3}$, $P_{M4}$, which are configured to control output power tubes $M_1$ to $M_4$ of the output branch path. The first switching frequency pulse signal $P_{M1}$ is inputted to a gate of the first output power tube $M_1$. The second switching frequency pulse signal $P_{M2}$ is inputted to a gate of the second output power tube $M_2$. The third switching frequency pulse signal $P_{M3}$ is inputted to a gate of the third output power tube $M_3$. The fourth switching frequency pulse signal $P_{M4}$ is inputted to a gate of the fourth output power tube $M_4$.

The phase-locked loop 107 generates a PLL voltage signal $V_c$, and the PLL voltage signal $V_c$ is inputted to the input trunk duty ratio generation unit. The input trunk duty ratio generation unit generates a turn-on control signal D according to the PLL voltage signal $V_c$ and the frequency signal $F_{ss}$, and the turn-on control signal D is inputted to a control terminal of the input trunk through the driving unit 111. The driving unit 111 is configured to convert a low-power electrical signal into an electrical signal for controlling a power output.

Specifically, the phase-locked loop 107 is configured to compare the frequency signal $F_{ss}$ with a reference clock clk to produce a PLL voltage signal $V_c$ reflecting a magnitude of a difference between the two frequencies. The input trunk duty ratio generation unit produces a turn-on control signal D through action of the PLL voltage signal $V_c$. The driving unit 111 generates a fifth driving signal $P_{M5}$ and a sixth driving signal $P_{M6}$ according to the turn-on control signal D. The fifth driving signal $P_{M5}$ is inputted to the gate of the fifth input power tube $M_5$, and the sixth driving signal $P_{M6}$ is inputted to the gate of the sixth input power tube $M_6$. The switching cycle of the input trunk is controlled by the phase-locked loop 107, so that the converter does not limit a dynamic range of an error voltage.

Figure 9:
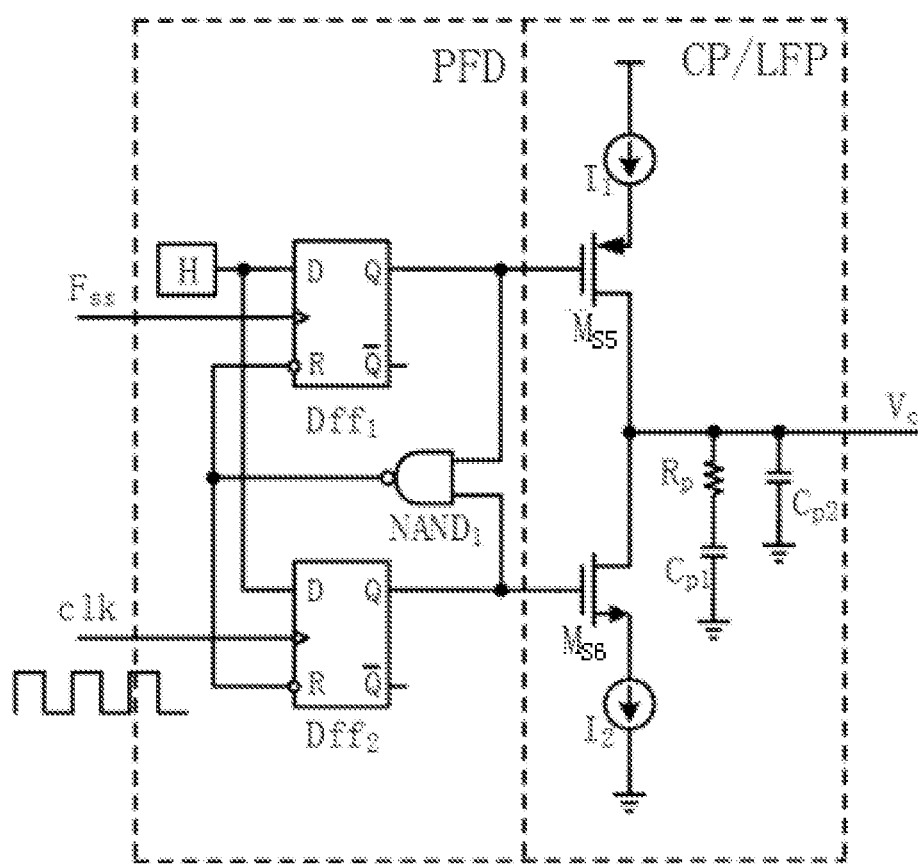
FIG. 9 is a schematic diagram of a circuit structure of a phase-locked loop according to the disclosure.

With reference to FIG. 9, the phase-locked loop 107 includes two parts, namely a phase frequency detector (PFD) and a charge pump/low-pass filter (CP/LPF). The phase frequency detector includes a first D flip-flop $Dff_1$, a second D flip-flop $Dff_2$ and a NAND gate $NAND_1$. A D terminal of the first D flip-flop $Dff_1$ and a D terminal of the second D flip-flop $Dff_2$ are both connected to a high potential, and a R terminal of the first D flip-flop $Dff_1$ and a R terminal of the second D flip-flop $Dff_2$ are connected to an output terminal of the NAND gate $NAND_1$. A Q terminal of the first D flip-flop $Dff_1$ and a Q terminal of the second D flip-flop $Dff_2$ are respectively connected to two input terminals of the NAND gate $NAND_1$. The frequency signal $F_{ss}$ is inputted to a clock input terminal of the first D flip-flop $Dff_1$, and the reference clock clk is inputted to a clock input terminal of the second D flip-flop $Dff_2$.

The charge pump/low-pass filter includes a first current source $I_1$, a second current source $I_2$, a fifth P-type field-effect transistor $M_{S5}$, a sixth N-type field-effect transistor $M_{S6}$, a fifth compensation capacitor $C_{p1}$, a sixth compensation capacitor $C_{p1}$, and a fifth compensation resistor $R_p$. A gate of the fifth P-type field-effect transistor $M_{S5}$ is connected to the Q terminal of the first D flip-flop $Dff_1$, and a gate of the sixth N-type field-effect transistor $M_{S6}$ is connected to the Q terminal of the second D flip-flop $Dff_2$. Magnitude of the currents of the first current source $I_1$ and the second current source $I_2$ are the same. The first current source $I_1$ flows into a source of the fifth P-type field-effect transistor $M_{S5}$, and the second current source $I_2$ flows into a source of the sixth N-type field-effect transistor $M_{S6}$. A drain of the fifth P-type field-effect transistor $M_{S5}$ is connected to a drain of the sixth N-type field-effect transistor $M_{S6}$, and is further connected to a terminal of the fifth compensation resistor $R_p$ and a terminal of the sixth compensation capacitor $C_{p2}$. At the same time, a connection terminal of the drain of the fifth P-type field-effect transistor $M_{S5}$ and the drain of the sixth N-type field-effect transistor $M_{S6}$ is an output terminal of a phase locked loop 107, which outputs the PLL voltage signal $V_c$. Another terminal of the fifth compensation resistor $R_p$ is grounded through the fifth compensation capacitor $C_{p1}$, and another terminal of the sixth compensation capacitor $C_{p2}$ is grounded.

The input trunk duty ratio generation unit includes a compensator 108, a sawtooth wave generator 109, and a comparator 110. The output terminal of the phase-locked loop 107 and an output terminal of the current sensor 101 are both connected to an input terminal of the compensator 108. The compensator 108 is responsible for compensating phase and gain of the circuit, and plays a role in stabilizing the loop. An input terminal of the sawtooth wave generator 109 is connected to an input terminal of the phase-locked loop 107, that is, the frequency signal $F_{ss}$ is further inputted to the input terminal of the sawtooth wave generator 109. The sawtooth generator 109 is configured to produce a sawtooth signal equivalent to the frequency signal $F_{ss}$ according to the frequency signal $F_{ss}$. An output terminal of the compensator 108 and an output terminal of the sawtooth wave generator 109 are respectively connected to input terminals of the comparator 110. Specifically, the output terminal of the compensator 108 is connected to a non-inverting input terminal of the comparator 110, and the output terminal of the sawtooth wave generator 109 is connected to an inverting input terminal of the comparator 110. An output terminal of the comparator 110 is connected to the driving unit 111. The comparator 110 is configured to produce a turn-on control signal D. The driving unit 111 generates the driving signals $P_{M5}$ and $P_{M6}$ according to the turn-on control signal D. The driving signal $P_{M5}$ is inputted to the gate of the fifth input power $M_5$, and the driving signal $P_{M6}$ is inputted to the sixth input power tube $M_6$, thereby controlling turning-on of the input trunk.

Figure 10:
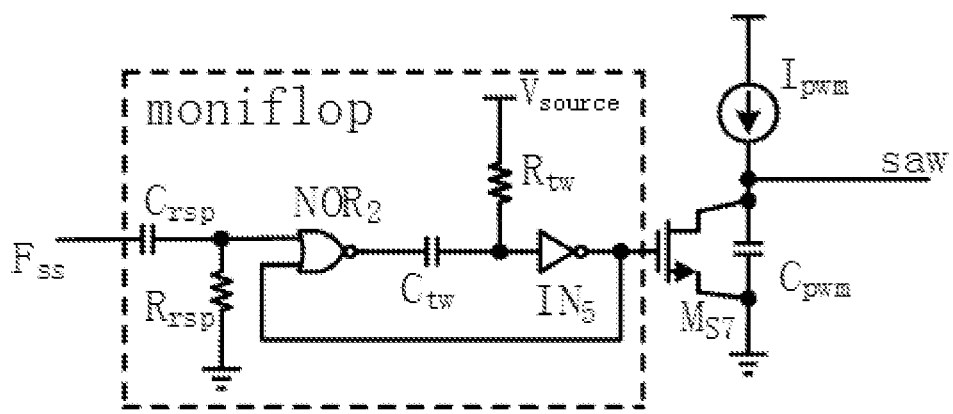
FIG. 10 is a schematic diagram of a circuit structure of a sawtooth wave generator according to the disclosure.

With reference to FIG. 10, the sawtooth wave generator 109 includes a monoflop, a seventh N-type field-effect transistor $M_{S7}$, a fifth capacitor $C_{pwm}$, and a third current source $I_{pwm}$. The frequency signal $F_{ss}$ is connected to an input terminal of the monoflop, and an output terminal of the monoflop is connected to a gate of the seventh N-type field-effect transistor $M_{S7}$. The third current source $I_{pwm}$ is connected to a drain of the seventh N-type field-effect transistor $M_{S7}$ and a terminal of the fifth capacitor $C_{pwm}$, and a source of the seventh N-type field-effect transistor $M_{S7}$ and another terminal of the fifth capacitor $C_{pwm}$ are grounded. The drain of the seventh N-type field-effect transistor $M_{S7}$ is a sawtooth wave signal output terminal, which outputs a sawtooth wave signal saw. The monoflop is triggered by the frequency signal $F_{ss}$ to output a pulse signal with a very small width, which is responsible for releasing a charge on the fifth capacitor $C_{pwm}$ within a short period of time at the beginning of each cycle and resetting the sawtooth wave signal saw at the same time.

Specifically, the monoflop includes a sixth capacitor $C_{rsp}$, a seventh capacitor $C_{tw}$, a sixth resistor $R_{rsp}$, a seventh resistor $R_{tw}$, a second NOR gate $NOR_2$, and a fifth inverter $IN_5$. The frequency signal $F_{ss}$ is inputted to an input terminal of the second NOR gate $NOR_2$ through the sixth capacitor $C_{rsp}$, and a connection terminal of the sixth capacitor $C_{rsp}$ and the second NOR gate $NOR_2$ is further grounded through the sixth resistor $R_{rsp}$. Another input terminal of the second NOR gate $NOR_2$ is connected to an output terminal of the fifth inverter $IN_5$, and the output terminal of the fifth inverter $IN_5$ is connected to the gate of the seventh N-type field-effect transistor $M_{S7}$. An output terminal of the second NOR gate $NOR_2$ is connected to an input terminal of the fifth inverter $IN_5$ through the seventh capacitor $C_{tw}$. The input terminal of the inverter $IN_5$ is further connected to the power terminal $V_{source}$ through the seventh resistor $R_{tw}$.

Figure 11:
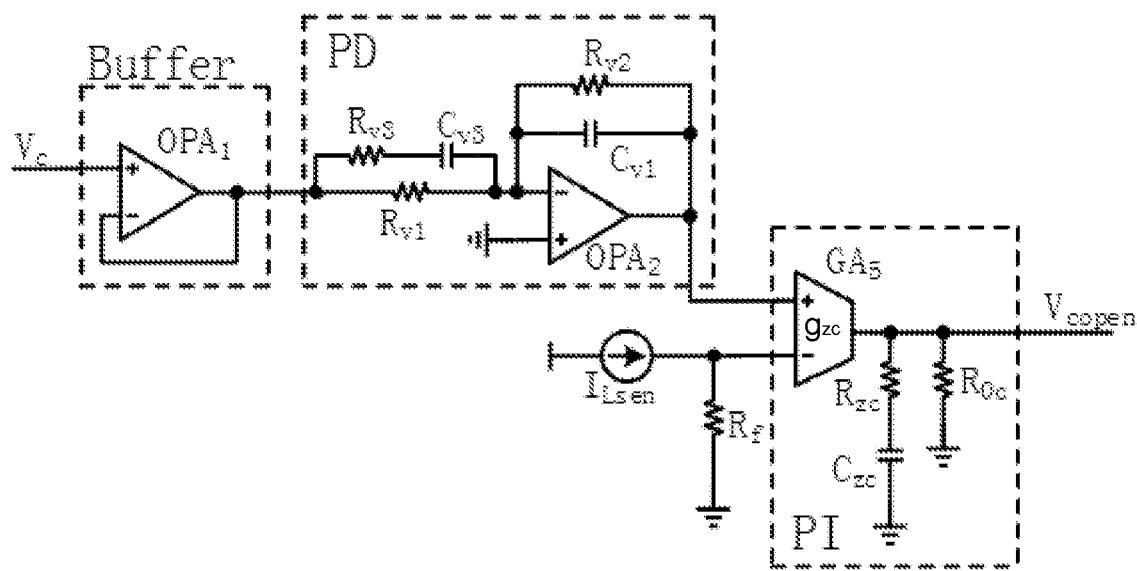
FIG. 11 is a schematic diagram of a circuit structure of a compensator according to the disclosure.

With reference to FIG. 11, the compensator 108 includes a buffer, a proportional derivative device, a proportional integral device, and a feedback resistor $R_f$. The output terminal of the phase-locked loop 107 is connected to an input terminal of the buffer, an output terminal of the buffer is connected to an input terminal of the proportional derivative device, an output terminal of the proportional derivative device is connected to an input terminal of the proportional integral device, the output terminal of the current sensor 101 is connected to another input terminal of the proportional integral device, and the another input terminal of the proportional integral device is further grounded through the feedback resistor $R_f$. An output terminal of the proportional integral device is connected to an input terminal of the comparator 110.

The buffer is a first operational amplifier $OPA_1$. A non-inverting input terminal of the first operational amplifier $OPA_1$ inputs the PLL voltage signal $V_c$, and an inverting input terminal is connected to an output terminal of the first operational amplifier $OPA_1$, and the output terminal is further connected to the proportional derivative device.

The proportional derivative device includes a second operational amplifier $OPA_2$, an eighth compensation resistor $R_{v1}$, a ninth compensation resistor $R_{v2}$, a tenth compensation resistor $R_{v3}$, an eighth compensation capacitor $C_{v1}$, and a ninth compensation capacitor $C_{v3}$. The output terminal of the first operational amplifier $OPA_1$ is connected to an inverting input terminal of the second operational amplifier $OPA_2$ through the eighth compensation resistor $R_{v1}$. The tenth compensation resistor $R_{v3}$ is connected in series with the ninth compensation capacitor $C_{v3}$. Another terminal of the tenth compensation resistor $R_{v3}$ is connected to the output terminal of the first operational amplifier $OPA_1$, and another terminal of the ninth compensation capacitor $C_{v3}$ is connected to the inverting input terminal of the second operational amplifier $OPA_2$. A non-inverting input terminal of the second operational amplifier $OPA_2$ is grounded. A terminal of the ninth compensation resistor $R_{v2}$ is connected to the inverting input terminal of the second operational amplifier $OPA_2$ and another terminal of the ninth compensation resistor $R_{v2}$ is connected to the output terminal of the second operational amplifier $OPA_2$. The eighth compensation capacitor $C_{v1}$ is connected in series with the ninth compensation resistor $R_{v2}$.

The proportional integral device includes a fifth operational transconductance amplifier $GA_5$, a tenth compensation capacitor $C_{zc}$, an eleventh compensation resistor $R_{zc}$, and a twelfth compensation resistor $R_{0c}$. A non-inverting input terminal of the fifth operational transconductance amplifier $GA_5$ is connected to the output terminal of the second operational amplifier $OPA_2$, an inverting input terminal of the fifth operational transconductance amplifier $GA_5$ is connected to the output terminal of the current sensor 101, and inverting input terminal of the fifth operational transconductance amplifier $GA_5$ is grounded through the feedback resistor $R_f$. An output terminal of the fifth operational transconductance amplifier $GA_5$ is grounded through the eleventh compensation resistor $R_{zc}$ and the tenth compensation capacitor $C_{zc}$, and is further grounded through the twelfth compensation resistor $R_{0c}$. The output terminal of the fifth operational transconductance amplifier $GA_5$ is the output terminal of the compensator 108, which outputs a compensation signal $V_{copen}$, and the compensation signal $V_{copen}$ is inputted to the positive input terminal of the comparator 110.

The converter generates the four end flag signals $S_1$ to $S_4$ through the four paths charge controllers according to the current signal $I_{Lsen}$ of the input trunk collected concurrently, and the logic unit 106 generates the four turn-on time signals D1 to D4 according to the four end flag signals $S_1$ to $S_4$. The four turn-on time signals $D_1$-$D_4$ control the four output branch paths to turn on sequentially through the action of the driving unit 111. Concurrently, the logic unit 106 further generates the frequency signal $F_{ss}$ according to the total turn-on time of the four turn-on time signals $D_1$ to $D_4$. The frequency signal $F_{ss}$ generates the turn-on control signal D through the actions of the phase-locked loop 107, the compensator 108, the sawtooth generator 109, and the comparator 110. The turn-on control signal D is inputted to the driving unit 111 to generate a control signal to control turning-on of the fifth input power tube $M_5$ and the sixth input power tube $M_6$ of the input trunk. That is, within the time period of the frequency signal $F_{ss}$, the four output branch paths are turned on sequentially, so that the converter may fully utilize the entire charging cycle. The converter does not has any additional inductor current, and the power level loss with the same load is smaller, the transmission efficiency is higher, and the ripple wave of the output voltage is smaller, thereby eliminating the requirement of the input source having to be a rechargeable battery, and the limitations of application. In addition, the converter realizes charge control for all the output branch paths, therefore its cross modulation is smaller, and it does not require the last branch path to have a sufficiently heavy load, which broadens the load range.

The above-mentioned are only preferred embodiments of the disclosure. It is understood that those skilled in the art may make several modifications and improvements, without departing from the structure of the disclosure, which do not affect the implementation of the disclosure and the practicality of the patent.

What is claimed is:
1. A single-inductor multiple-output DC-DC buck converter, comprising a power conversion unit and a number of charge controllers,
   wherein the power conversion unit comprises the number of output branch paths that share a common point at an input trunk, one of the number of the charge controllers corresponds to one of the number of the output branch paths, and further comprising a phase-locked loop, a logic unit, a driving unit, and an input trunk duty ratio generation unit, wherein the number of the charge controllers respectively collect a current signal of the input trunk, generate the number of end flag signals according to the current signal, and input the number of the end flag signals to the logic unit, the logic unit generates the number of turn-on time signals and a frequency signal, the number of the turn-on time signals are inputted to control terminals of the number of the output branch paths through the driving unit, and the frequency signal is inputted to the phase-locked loop, the phase-locked loop generates a PLL voltage signal, and the PLL voltage signal is inputted to the input trunk duty ratio generation unit, the input trunk duty ratio generation unit generates a turn-on control signal according to the PLL voltage signal and the frequency signal, and the turn-on control signal is inputted to a control terminal of the input trunk through the driving unit, and the driving unit is configured to convert a low-power electrical signal into an electrical signal for controlling a power output, where the number is a natural number, wherein the frequency signal is consistent with a first turn-on time signal of the number of the turn-on time signals, wherein the logic unit comprises a plurality of inverters and a plurality of RS flip-flops, a first OR logic device, and a NOR logic device, wherein input terminals of the plurality of inverters and output terminals of the number of the end flag signals of the number of the charge controllers are respectively correspondingly connected, output terminals of the plurality of inverters are respectively correspondingly connected to R terminals of the plurality of RS flip-flops, the output terminals of the plurality of inverters are further connected to S terminals of an adjacent RS flip-flop of the plurality of RS flip-flops, the output terminal of a last inverter of the plurality of inverters is connected to an input terminal of the first OR logic device, and wherein Q terminals of the plurality of RS flip-flops are respectively correspondingly connected to input terminals of the NOR logic device, an output terminal of the NOR logic device is connected to another input terminal of the first OR logic device, an output terminal of the first OR logic device is connected to the S terminal of a first RS flip-flop of the plurality of RS flip-flops, the Q terminals of the plurality of RS flip-flops output the number of conduction time signals; the Q terminal of the first RS flip-flop of the plurality of RS flip-flops outputs the first turn-on time signal.

2. A single-inductor multiple-output DC-DC buck converter, comprising a power conversion unit and a number of charge controllers, wherein the power conversion unit comprises the number of output branch paths that share a common point at an input trunk, one of the number of the charge controllers corresponds to one of the number of the output branch paths, and further comprising a phase-locked loop, a logic unit, a driving unit, and an input trunk duty ratio generation unit, wherein the number of the charge controllers respectively collect a current signal of the input trunk, generate the number of end flag signals according to the current signal, and input the number of the end flag signals to the logic unit, the logic unit generates the number of turn-on time signals and a frequency signal, the number of the turn-on time signals are inputted to control terminals of the number of the output branch paths through the driving unit, and the frequency signal is inputted to the phase-locked loop, the phase-locked loop generates a PLL voltage signal, and the PLL voltage signal is inputted to the input trunk duty ratio generation unit, the input trunk duty ratio generation unit generates a turn-on control signal according to the PLL voltage signal and the frequency signal, and the turn-on control signal is inputted to a control terminal of the input trunk through the driving unit, and the driving unit is configured to convert a low-power electrical signal into an electrical signal for controlling a power output, where the number is a natural number, further comprising a current sensor, wherein the current sensor is connected to the input trunk, and the current sensor generates the current signal, wherein the input trunk duty ratio generation unit comprises a compensator, a sawtooth wave generator, and a comparator, wherein an output terminal of the phase-locked loop and an output terminal of the current sensor are both connected to an input terminal of the compensator respectively, the frequency signal is inputted into the sawtooth wave generator, an output terminal of the compensator and an output terminal of the sawtooth wave generator are respectively connected to input terminals of the comparator, and an output terminal of the comparator is connected to the driving unit, and wherein the compensator comprises a buffer, a proportional derivative device, a proportional integral device, and a feedback resistor, wherein the output terminal of the phase-locked loop is connected to an input terminal of the buffer, an output terminal of the buffer is connected to an input terminal of the proportional derivative device, an output terminal of the proportional derivative device is connected to an input terminal of the proportional integral device, the output terminal of the current sensor is also connected to another input terminal of the proportional integral device, the another input terminal of the proportional integral device is further grounded through the feedback resistor, an output terminal of the proportional integral device is connected to an input terminal of the input terminals of the comparator.

* * * * *